(12) United States Patent
Summerlin et al.

(10) Patent No.: US 6,224,310 B1
(45) Date of Patent: May 1, 2001

(54) BLIND RIVET AND METHOD OF MAKING SAME

(75) Inventors: Frederick Arthur Summerlin, Devon; Harvey Philip Jeal, Herts, both of (GB)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/308,905

(22) PCT Filed: Nov. 19, 1997

(86) PCT No.: PCT/IB97/01467

§ 371 Date: Jul. 15, 1999

§ 102(e) Date: Jul. 15, 1999

(87) PCT Pub. No.: WO98/23872

PCT Pub. Date: Jun. 4, 1998

(30) Foreign Application Priority Data

Nov. 28, 1996 (GB) .................................................. 9624710

(51) Int. Cl.$^7$ ............................. F16B 13/04; F16B 13/06
(52) U.S. Cl. ................................. 411/34; 411/43; 411/70; 470/30
(58) Field of Search .................................. 411/34–38, 43, 411/69, 70; 470/30

(56) References Cited

U.S. PATENT DOCUMENTS

| 2,030,169 | * | 2/1936 | Huck ....................................... 411/34 |
| 3,230,818 | * | 1/1966 | Siegol ..................................... 411/34 |
| 3,286,580 | * | 11/1966 | Jeal ....................................... 411/34 |
| 4,988,247 | * | 1/1991 | Summerlin ............................. 411/38 |
| 5,496,140 | * | 3/1996 | Gossmann et al. .................... 411/43 |
| 5,503,510 | * | 4/1996 | Golan ..................................... 411/43 |

* cited by examiner

Primary Examiner—Neill Wilson
(74) Attorney, Agent, or Firm—Edward D. Murphy

(57) ABSTRACT

A self-plugging blind rivet for securing together apertured members comprises a tubular shell (11) having a tail end fact (16) at one end, a pre-formed radially enlarged head (13) at the other end, and a stem which extends through the shell and has a stem head (22) adjacent the tail end fact (16) of the shell. The region adjacent the stem head (22) is of increased diameter relative to the rest of the stem shank and has a plurality of axial depressions (26) formed therein, the corresponding region of the shell being arranged to fill the axial depressions (16) in the stem and being harder than the material of the shell (11) in a region adjacent the radially enlarged head (13). In use and under axial compression leading of the shell (11), the shell (11) buckles in the region adjacent the member remote from the performed head to form a blind head in contact with said member so as to clamp together the apertured members.

11 Claims, 4 Drawing Sheets

BLIND RIVET AND METHOD OF MAKING SAME

BACKGROUND OF THE INVENTION

The invention relates to a blind rivet. A blind rivet is one that can be inserted and set by access to one side only of apertured members to be riveted together,

SUMMARY OF THE INVENTION

More particularly the invention relates to a self plugging blind rivet comprising a tubular shell having a preformed radial head at one end, and a stem extending through the tubular shell and having a stem head adjacent the tail end of the shell. In use, the rivet is inserted, shell tail end first, through the apertures in the members to be riveted until the shell head contacts the nearer member and the shell tail end protrudes beyond the further member. In order to set the rivet, the shell head is supported by an abutment and the stem is then pulled so that the stem head compresses the shell against the abutment and causes axial contraction of the shell and radial expansion of at least part thereof co form a blind head which, together with the preformed head, clamps the members together. At least part of the stem adjacent to its head is retained within the shell to plug the latter after the rivet has been set. The remainder of the stem i.e. the tail end remote from the head thereof) is preferably broken off to avoid protrusion from the shell head.

Such self-plugging blind rivets are well known and widely used. In practice it is highly desirable for the set rivet to exhibit a number of different advantageous characteristics, e.g. wide grip range (the range of total thicknesses of members over which identical rivets will perform satisfactorily); good clench characteristics (the ability to pull together members which are initially separated); good hole fill (the ability to fill the apertures in the riveted members); high shear strength; good stew retention; high tension strength of the set rivet throughout the grip range; and no protrusion of the retained portion of the stem from the preformed head of the set rivet.

These characteristics involve different design features, some of which are mutually conflicting. The present invention seeks to provide a rivet which meets these characteristics and which is simple and easy to manufacture. In order to obtain wide grip range the rivet must form a satisfactory blind head in a position which is in contact with the back sheet in minimum grip and also provide a satisfactory blind head in thicker sheets right up to a maximum grip. A good blind head is essential if high tension strength is to be attained. Good stem retention needs to be achieved by positive interlocking of stem and shell, not only to prevent the stem from falling out and spoiling the appearance but also to assist in making the joint watertight. Hole fill can be attained by ensuring that the shank of the rivet is comparatively soft so that during installation the shank of the rivet shortens and expands to fill the hole. This effect also contributes to good clench characteristics. If high shear strength is to be maintained, the retained part of the stem in the set rivet must lie within the riveted members and across their cleavate or contact plane. In turn if at the same time the retained part of the stem is not to protrude beyond the preformed shell head, the total length of the rivet must vary little throughout the grip range.

EP-A-0398512 discloses a self-plugging blind rivet comprising a tubular shell shank having a preformed radially enlarged head at one end, and a region of increased diameter and hardness at the tail end, adjacent the head of the stem. The rivet is formed by compressing the stem and a plain cylindrical shell in a die having a portion of enlarged bore diameter at the tail end region, whereby the shell is expanded into the enlarged bore portion with resulting work hardening. In use, the relatively soft region of the shank adjacent the head preferentially buckles under axial compression forces and forms a blind head to clamp together the workpiece members.

The rivet of EP-A-0398512 requires the use of a split die to enable the rivet to be removed. Split dies are complicated in use and are subject to wear. Also the reduced diameter of the major portion of the shank makes the provision of hole fill more difficult.

One possible solution to both these problems is to use a stem which has a circumferential groove in the stem shank immediately under the head and to form the rivet by axially compressing the stem and a plain cylindrical shell in a solid die so that the material of the shell is forced into the circumferential groove to provide a thickened shell wall of increased hardness. Rivets of this construction are shown in GB 2233059B. As in the case of EP-A-0398512, in use, the relatively soft region of the shank adjacent the head preferentially buckles under axial compression forces and forns a blind head to clamp together the workpiece members.

The provision of a circumferential groove under the stem head reduces the strength of the stem at this point and it is therefore necessary correspondingly to reduce the strength of the breakneck which determines the position at which the stem breaks when the rivet is placed. This effect restricts the workable range of stem shank diameter and shell wall thickness, compromising rivet performance.

Furthermore the axial loads required to fill the groove under the stem head also fill the breakneck and unless the breakneck has minimum length this affects the function of the rivet since during placing the material forced into the breakneck needs to be sheared.

In a first aspect, the present invention provides a self plugging blind rivet for securing together apertured members, the rivet comprising a tubular shell having a tail end face at one end and a preformed radially enlarged head at the other end, and a stem which extends through the shell and has a stem head adjacent the tail end face of the shell, in which the region adjacent the stem head is of increased diameter relative to the rest of the stem shank and has a plurality of axial depressions formed therein, the corresponding region of the shell being arranged to fill the axial depressions in the stem and being harder than the material of the shell in a region adjacent the radially enlarged head, whereby, in use and under axial compression loading of the shell, the shell buckles in the region adjacent the member remote from the preformed head to form a blind head in contact with said member so as to clamp together the apertured members.

Preferably, the cross sectional area and strength of the stem in the region adjacent the stem head are substantially equal to those of the cylindrical part of the stem. The distance across the mouth of the depressions may vary between 25 and 75% of the circumferential width of the land areas between and defining the depressions, preferably between 45 and 55%, for example 50%. According to a second aspect of the invention, a method is provided of assembling a rivet comprising a tubular rivet shell having a preformed radially enlarged head at one end, and a stem comprising a head and a shank having a region of increased diameter formed with a plurality of axial depressions adjacent the head, the method comprising inserting the shell in a die having a bore a first part of which closely fits the outside diameter of the shell, the tail end of the shell protruding into a second part of the bore having a larger diameter, supporting the head of the shell with an abutment, inserting a punch which has a first diameter closely fitting the bore of the rivet shell, a second diameter equal to the increased diameter under the head of the stem and a third diameter equal to the larger bore of the die, applying a compressive force between the punch and the abutment so as to open the bore of the tail end of the shell to be equal to the increased diameter under the head of the stem, and compressing the tail end of the shell so as to increase its wall thickness, removing the abutment and punch, inserting a stem and ejecting the assembled stem and shell from the die. During assembly, the material o the shell is forced into the longitudinal recesses in the stem and preferably provides a work hardened region at the tail end of the assembled rivet.

Preferably the external diameter of the shell in the assembled rivet is equal to the diameter of the stem head. To this end the first die bore should have the same diameter as the stem head, although this may be difficult to arrange in practice. Consequently it is preferable that the stem head before assembly of the rivet is slightly larger than the first die bore so that, when the assembly is ejected the stem head is sized to the diameter of the first bore and, hence to the diameter of the shell.

According to a further aspect of the invention there is provided a blind rivet in which the stem comprises a first stem portion and a pintail, a breakneck being provided between the first stem portion and the pintail, and the first stem portion is on the stem head side of the breakneck and the entire first stem portion is retained in the rivet and is of a larger diameter than the pintail of the stem such that, when the rivet is placed, the larger diameter of the first stem portion cannot pass through the hole in the nose of the placing tool and the pintail breaks off at the rivet head.

BRIEF DESCRIPTION OF THE ACCOMPANYING DRAWINGS

Embodiments of the invention will now be described by way of example and with reference to the accompanying drawings, in which.

DETAILED DESCRIPTION OF THE INVENTION

Figure 1:
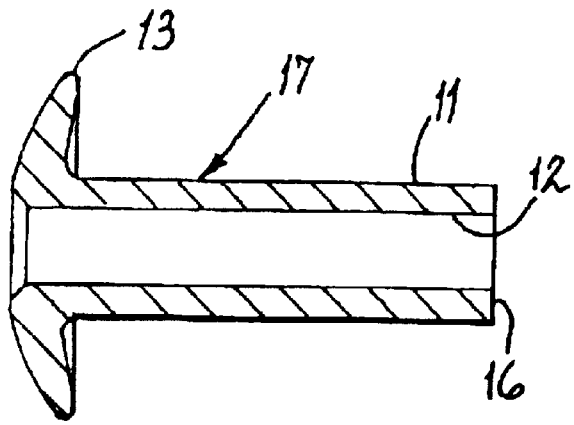
FIG. 1 is a longitudinal section through the shell of the rivet before assembly.

Referring first to FIG. 1, the shell 17 comprises a tubular body 11 having a consentric cylindrical bore 12 and at one end a radially enlarged head 13. The tail end 16 of the shell is flat and at right angles to the shell axis.

Figure 2:
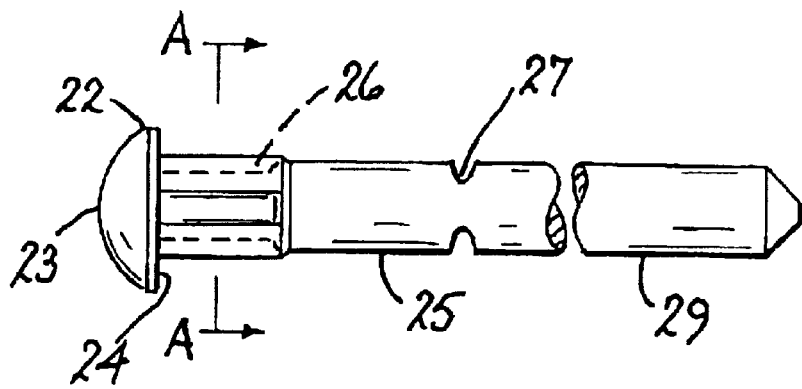
FIG. 2 is a side elevation of the stem of a rivet before assembly.

The stem shown in FIG. 2 is elongate and generally cylindrical. At one end it has an integral radially enlarged head 22 which has a convey, face 23 directed away from the stem shank 25 and a flat annular face 24 directed towards the stem shank. The diameter of the stem head is larger than the diameter of the body of the shell 11. Immediatel adjacent the stem head the shank of the stem carries a plurality of axial depressions 26. These depressions are produced by a forming process so that the stem material from the depressions forms land 28 between the depressions and the cross section in this area and consequently its strength is substantially unchanged.

Figure 4:
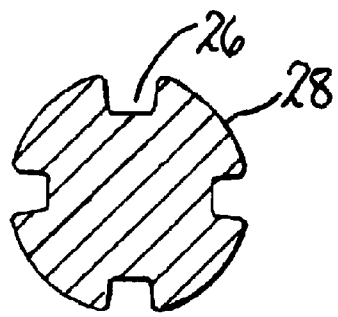
FIG. 4 is a section along the line A—A for both FIG. 2 and FIG. 3.

FIG. 4 is a section through a typical stem. In this example tho width across the mouth of the depression 26 is one half of the circumferential width of the land 28.

Spaced farther away from the stem head is a groove 27, which constitutes a breakneck which determines the position at which the stem breaks when the rivet is placed The diameter of the pintail 29 is equal to that of the stem shank 25.

Figure 3:
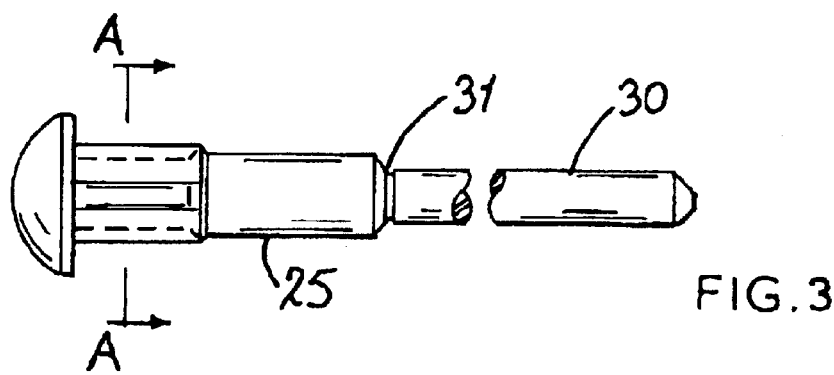
FIG. 3 is a side elevation of an alternative form of stem.

FIG. 3 shows an alternative to the stem of FIG. 2 and is arranged so that when assembled to a rivet shell and the rivet is set the stem always breaks flush with the head of the rivet shell. To this end the pintail 30 has a reduced diameter relative to the stem shank 25 and the break neck is formed at the junction of stem shank 25 and pintail 30. Otherwise the stem of FIG. 3 is the same as the stem of FIG. 2.

Figure 5:
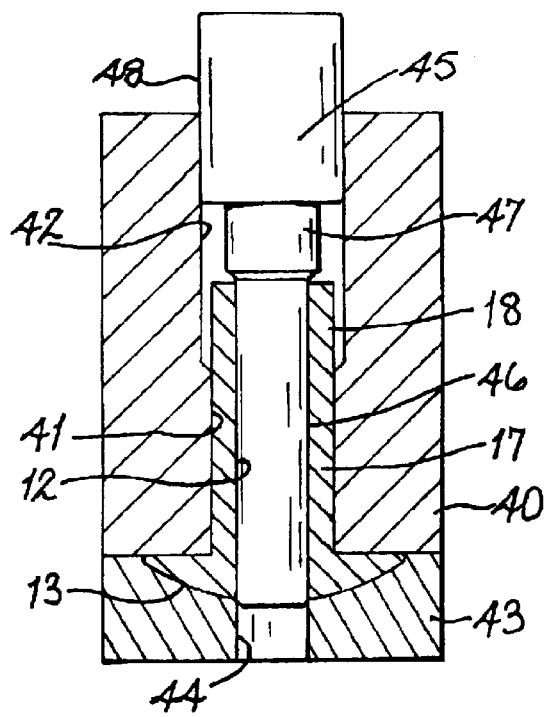
FIG. 5 is a section through a die containing a rivet body before commencement of the first stage of the assembly process.

FIG. 5 shows a rivet shell 17 placed in a die 40. Die 40 has a small bore 41 which closely fits the outside diameter of the rivet shell and the tail 18 of the rivet shell protrudes into a somewhat larger bore 42. The head of the rivet 13 is supported by member 43 which closely conforms to the rivet head and has a central bore 44. Punch 45 is inserted into large bore 42 of the die so that the smallest diameter 46 of the punch enters the bore 12 of the rivet shell in which it is a close fit. Punch 45 also carries a portion 47 which has a diameter substantially equal to the major diameter of the stem under the stem head. The largest diameter 48 of the punch is a close fit in the larger die bore 42.

Figure 6:
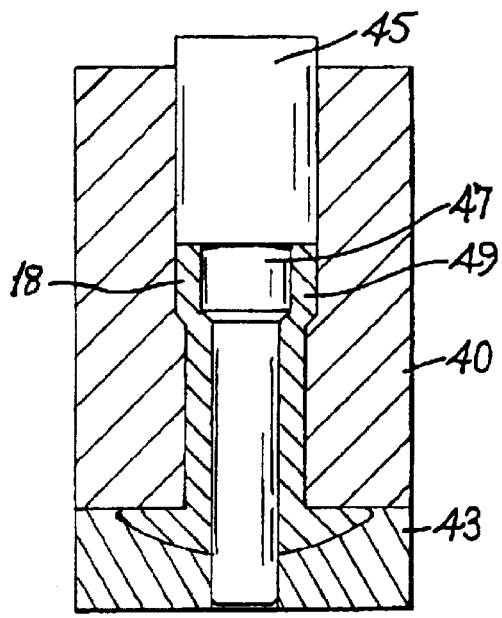
FIG. 6 is similar to FIG. 5 but shows the first stage of the assembly process completed.

FIG. 6 shows the completion of the first stage of the assembly. Punch 45 is urged towards the support member 43. The intermediate diameter 47 of the punch 45 has entered the tail 18 of the rivet expanding it to match the major under head diameter of the stem 26 and subsequently the tail 18 of the rivet shell is compressed to fill the larger diameter of the die 42 producing an enlarged tail 49.

Figure 7:
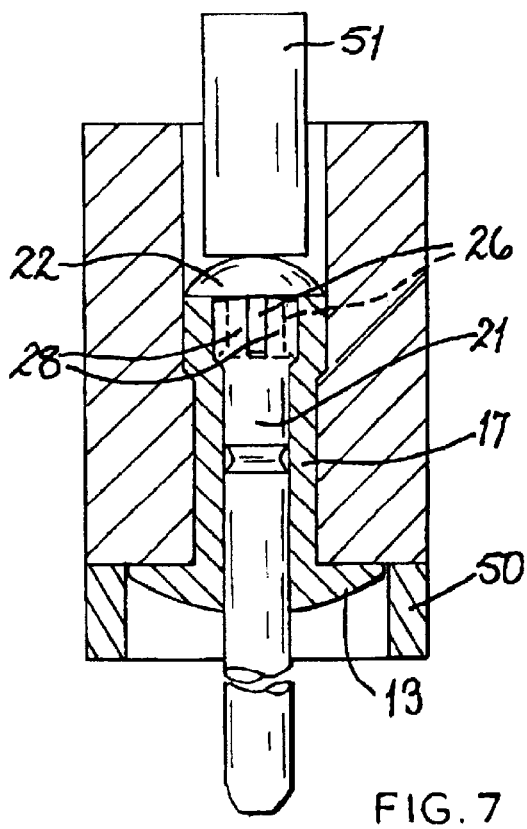
FIG. 7 is similar to FIG. 6 but shows the stem inserted in the rivet.
Figure 8:
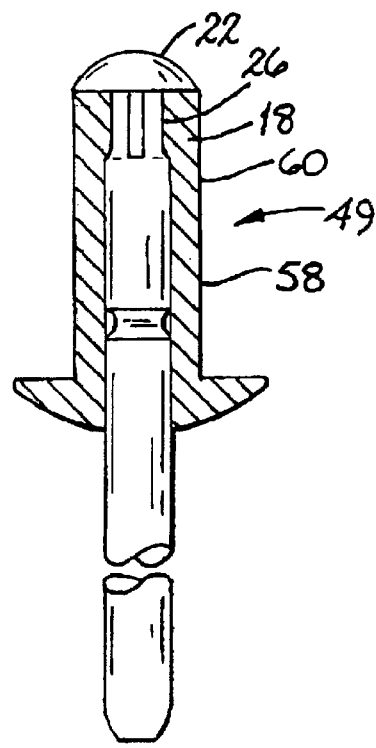
FIG. 8 shows the assembly process completed and the assembled rivet ejected from the die.

For the second stage of the assembly punch 45 is withdrawn, member 43 is retracted and die 40 together with the formed rivet shell 17 is moved to a second assembly station (FIG. 7). Here stem 21 is inserted. Die 40 is now supported by member 50. Compressive force is now applied via punch 51 which pushes rivet 48 out of the die in the process swaging the enlarged rivet tail 49 into the longitudinal recesses 26 and work hardening the rivet tail as shown in FIG. 8. Additionally the stem head 22 is sized to the exact diameter 58 of the completed assembly.

Swaging the tail end of the rivet 49 into the longitudinal depressions 26 not only strengthens and work hardens the tail of the rivet in the immediate vicinity of the recesses but also work hardens the rivet shank for a distance towards the head of the rivet, the extent of this work hardening being dependent on the relative volumes of the enlarged tail and the longitudinal recesses since excess material in the enlarged tail is extruded to form the part of the rivet shank adjacent to the recesses.

Figure 9:
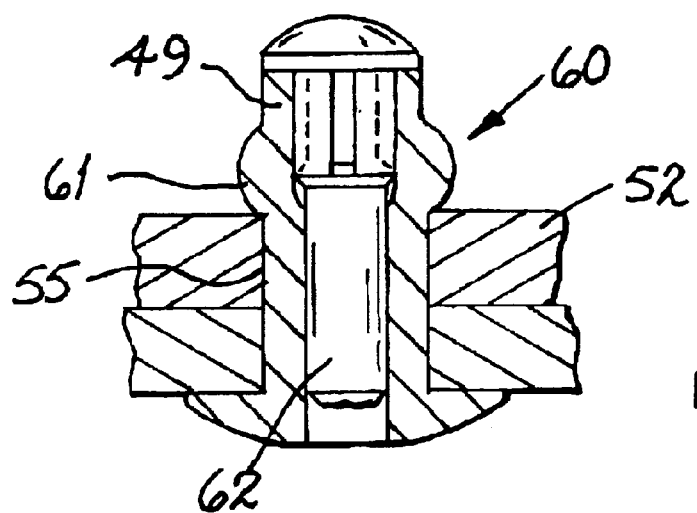
FIGS. 9, 10 and 11 show sections of rivets using the stem of FIG. 2 in sheets of maximum, mean, and minimum thicknesses respectively.
Figure 10:
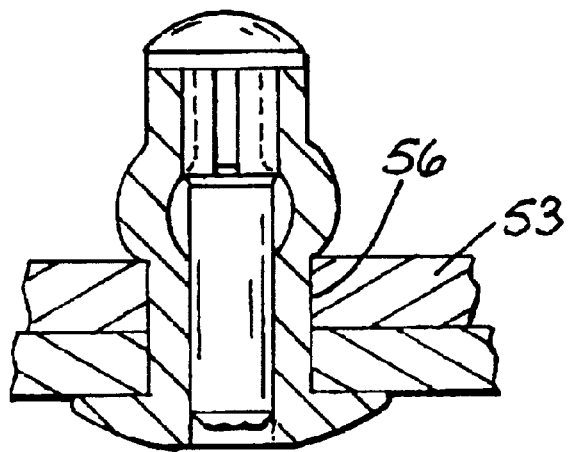
Figure 11:
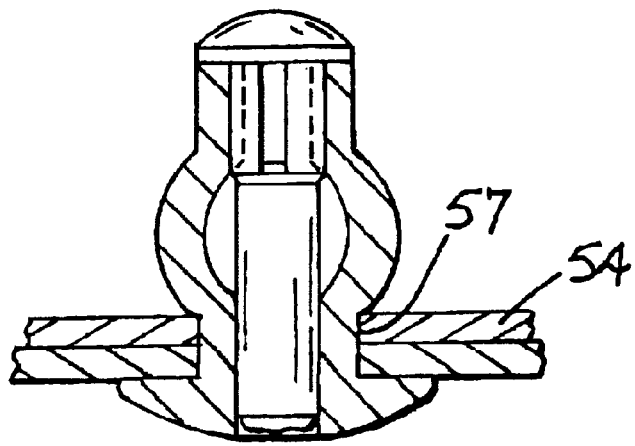

FIG. 9 shows a rivet set in maximum-thickness sheets, FIG. 10 in meari-thickness sheets and FIG. 11 in minimum-thickness sheets numbered 52, 53 and 54 respectively. The rivets are inserted in respective holes 55, 56 and 57, and set with a suitable pulling tool which has an annular anvil which abuts the head and gripping jaws that grip the protruding portion of the rivet stem. Operating the setting tool retracts the jaws relative so the anvil. Such setting tools are well known in the art of blind riveting.

The set rivet 60 in maximum sheet (FIG. 9) shows how bulb 61 forms adjacent to the back of sheets 52 but the tail of the rivet 49 is virtually not deformed. Thus the retained portion of the seem 62 remains locked to the shell.

FIGS. 10 and 11 show how due to the progressive work hardening of the shank the bulb always forms adjacent the back sheet.

Figure 12:
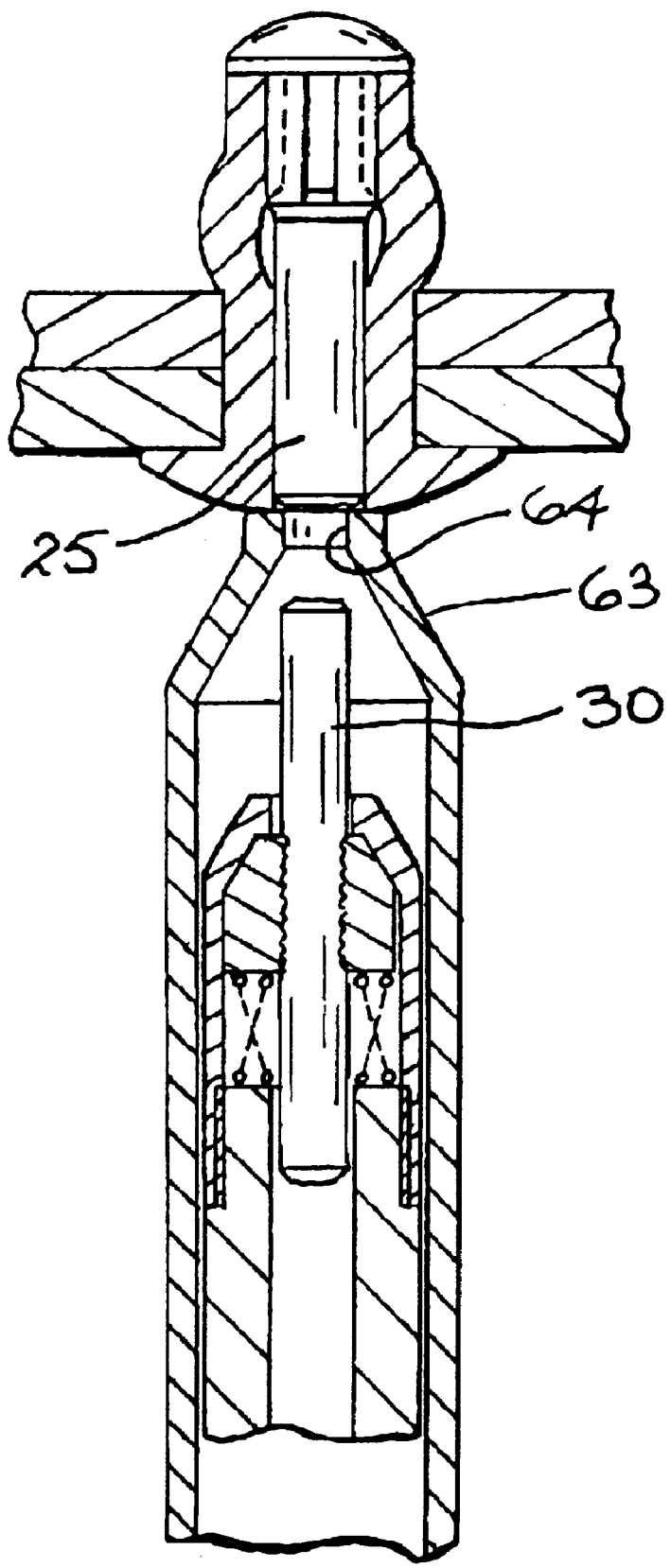
FIG. 12 shows how a rivet using the stem of FIG. 3 always ensures that the stem breaks flush with the head of the rivet.

It will be noted that stem 62 does not break at exactly the same position relative to the rivet head although this variation is not excessive. FIG. 12 shows a rivet setting tool in use with a rivet utilising the stem of FIG. 3.

Here the bore 64 of nosepiece 63 of the setting tool closely fits the pintail 3C and is smaller than stem shank 25. Breakneck 31 is of sufficient strength to ensure that stem shank 25 always contacts nose 63 so that a flush break can be obtained in all sheet thicknesses. Function of the rivet is similar to that of FIGS. 9, 10 and 11.

What is claimed is:

1. A self-plugging blind rivet for securing together apertured members, the rivet comprising a tubular shell (11) having a tail end face (16) at one end and a pre-formed radially enlarged head (13) at the other end, and a stem which extends through the shell and has a stem head (22) adjacent the tail end face (16) of the shell (11), in which the region adjacent the stem head is of increased diameter relative to the rest of the stem shank and has a plurality of axial depressions (26) formed therein, the corresponding region of the shell being arranged to fill the axial depressions (26) in the stem and being harder than the material of the shell (11) in a region adjacent the radially enlarged head (13), whereby, in use and under axial compression loading of the shell, the shell (11) buckles in the region adjacent the member remote from the preformed head to form a blind head in contact with said member so as to clamp together the apertured members.

2. A. blind rivet according to claim 1, in which the cross-sectional area and strength of the stem in the region adjacent the stem head are substantially equal to those of the cylindrical part of the stem.

3. A blind rivet according to claim 1 or claim 2, in which the distance across the mouth of the depressions (26) is between 25% and 75% of the circumferential width of the land areas (28) between and defining the depressions.

4. A blind rivet according to claim 3, in which the distance across the mouth of the depressions (26) is between 45% and 55% of the circumferential width of the land areas (28) between and defining the depressions (26).

5. A blind rivet according to claim 1, in which the stem comprises a first stem portion (25) and a pintail, 30),a breakneck (31) being provided between the first stem portion (25) and the pintail (30), and the first stem portion (25) is on the stem head side of the breakneck (31) and the entire first stem portion (25) is retained in the rivet and is of a larger diameter than the pintail (30) such than, when the rivet is placed, the larger diameter of the first stem portion (25) cannot pass through the hole in the nose of the placing tool and the pintail (30) breaks off at the rivet head.

6. A me-hod of assembling a rivet comprising a tubular rivet shell (11) having a pre-formed radially enlarged head (13) at one end, and a stem comprising a head (22) and a shank (25) having a region of increased diameter formed with a plurality of axial depressions (26, adjacent the head (22), the method comprising inserting the shell (11) in a die (40) having a bore, a first part (41) of which closely fits the outside diameter of the shell (11), the tail end (16) of the shell (11) protruding into a second part (42) of the bore (40) having a larger diameter, supporting the head (13) of the shell (11) with an abutment (43, inserting a punch (45) which has a first diameter (46) closely fitting the bore (12) of the rivet shell (11), a second diameter (47) equal to the increased diameter under the head (22) of the stem and a third diameter (48) equal to the larger bore (42) of the die (40), applying a compressive force between the punch (45) and the abutment (43) so as to open the bore of the tail end (16) of the shell (11) to be equal to the increased diameter under the head (22) of the stem, and compressing the tail end (16) of the shell (11) so as to increase its wall thickness, removing the abutment (43) and punch (45), inserting a stem (21) and ejecting the assembled stem and shell from the die.

7. A method according to claim 6, in which during assembly, the material of the shell is forced into the longitudinal recesses in the stem providing a work hardened region at the tail end of the assembled rivet.

8. A method according to claim 6 or claim 7, in which the first die bore (41) has the same diameter as the stem head (22).

9. A method according to claim 6 or claim 7 in which the first die bore (41) has a slightly larger diameter than the stem head (22).

10. A method according to claim 6, in which the stem head (22) before assembly of the rivet is slightly larger than the first die bore (41) such that, when the assembly is ejected, the stem head (22) is sized to the diameter of the first bore (41).

11. A self-plugging blind rivet securing together apertured members, the rivet comprising a tubular shell (11) having a tail end face (16) at one end and a pre-formed radially enlarged head (13) at the other end, and a stem (28) which extends through the shell (11) and has a stem head (22) adjacent the tail end face (16) of the shell (11), in which the region adjacent the stem head (22) is of increased diameter relative to the rest of the stem shank (28) and has a plurality of axial depressions (16) formed therein, the stem shank (25) in the area of the axial depressions (26) being formed of a material comparatively harder than the material forming the shell (11) which is joined to the stem shank at the axial depressions (26) upon material of the shell (11) being forced under compression to flow into the axial depressions (26) of the stem shank (25).

\* \* \* \* \*